(12) United States Patent
Dong et al.

(10) Patent No.: US 9,823,515 B2
(45) Date of Patent: Nov. 21, 2017

(54) SUBSTRATE AND AN ARRAY SUBSTRATE

(71) Applicants: BOE Technology Group Co., Ltd., Beijing (CN); Beijing BOE Optoelectronics Technology Co., Ltd., Beijing (CN)

(72) Inventors: Tingze Dong, Beijing (CN); Dongsheng Huang, Beijing (CN); Qian Zhang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 9 days.

(21) Appl. No.: 14/907,385

(22) PCT Filed: Sep. 18, 2015

(86) PCT No.: PCT/CN2015/089999
§ 371 (c)(1),
(2) Date: Jan. 25, 2016

(87) PCT Pub. No.: WO2016/150123
PCT Pub. Date: Sep. 29, 2016

(65) Prior Publication Data
US 2017/0108741 A1    Apr. 20, 2017

(30) Foreign Application Priority Data

Mar. 24, 2015 (CN) .......................... 2015 1 0130550

(51) Int. Cl.
*H01L 27/14* (2006.01)
*G02F 1/1337* (2006.01)
(Continued)

(52) U.S. Cl.
CPC .... *G02F 1/133784* (2013.01); *G02F 1/13439* (2013.01); *G02F 1/133345* (2013.01); *G02F 1/1368* (2013.01)

(58) Field of Classification Search
CPC ....................... G02F 1/133345; G02F 1/13439
(Continued)

(56) References Cited

FOREIGN PATENT DOCUMENTS

| CN | 103869546 A | 6/2014 |
|---|---|---|
| CN | 104020611 | * 9/2014 |

(Continued)

OTHER PUBLICATIONS

Dec. 2, 2015—(WO)—International Search Report and Written Opinion Appn PCT/CN2015/089999 with English Tran.
(Continued)

*Primary Examiner* — Tan N Tran
(74) *Attorney, Agent, or Firm* — Banner & Witcoff, Ltd.

(57) ABSTRACT

A substrate, comprising at least one array substrate, each array substrate on the substrate being provided with a spacing region at its periphery, and each array substrate comprising a display region and a driving region at the margin of the display region. The spacing region comprises a first region and a second region. The first region corresponds to an extension of the driving region on the substrate along an orientation friction direction, and the second region corresponds to an extension of the display region on the substrate along the orientation friction direction. A plurality of via holes are distributed in an overlapping area between the first region and the second region. The via holes have a diameter larger than the diameter of the fibers of orientation friction cloth.

20 Claims, 3 Drawing Sheets

(51) Int. Cl.
G02F 1/1333 (2006.01)
G02F 1/1343 (2006.01)
G02F 1/1368 (2006.01)

(58) Field of Classification Search
USPC .................................... 257/59, 72, 258, 432
See application file for complete search history.

(56) References Cited

FOREIGN PATENT DOCUMENTS

| | | |
|---|---|---|
| CN | 104020611 A | 9/2014 |
| CN | 104280939 A | 1/2015 |
| CN | 104280940 A | 1/2015 |
| CN | 104678656 A | 6/2015 |
| EP | 2365385 A1 | 9/2011 |
| JP | 60214340 A | 10/1985 |
| JP | 2007079211 A | 3/2007 |

OTHER PUBLICATIONS

Jan. 25, 2017—(CN) First Office Action Appn 201510130550.X with English Tran.

* cited by examiner

SUBSTRATE AND AN ARRAY SUBSTRATE

The application is a U.S. National Phase Entry of International Application No. PCT/CN2015/089999 filed on Sep. 18, 2015, designating the United States of America and claiming priority to Chinese Patent Application No. 201510130550.X filed on Mar. 24, 2015. The present application claims priority to and the benefit of the above-identified applications and the above-identified applications are incorporated by reference herein in their entirety.

TECHNICAL FIELD

Embodiments of the present disclosure relate to a substrate and an array substrate.

BACKGROUND

A liquid crystal display device comprises an array substrate comprising a display region, in which crossed gate lines and data lines are disposed, and a driving region at the margin of the display region, in which disposed are, a data signal binding area located in an extending direction of the data line, a data line lead wire connecting the data line and the data line binding area, a gate signal binding area located in an extending direction of the gate line or located in the extending direction of the data line, a gate line lead wire connecting the gate line and the gate signal binding area, an electrical detection area located at both ends of the driving region and a void area in which no component is disposed.

In addition, an orientation film is further disposed in the display region of the array substrate. The orientation film is in contact with liquid crystal molecules and pre-orientates the liquid crystal molecules in a certain angle. Surface of the orientation film is required to be subjected to friction by cloth disposed on a roller surface and the orientation friction direction is in parallel with the extending direction of the data line or is angled by 45° with respect to the extending direction of the data line. The process makes the surface of the orientation film create grooves having identical orientations, so as to pre-orientate liquid crystal molecules.

The inventor has found that different areas in the driving region have different thicknesses. For example, a probe is to be inserted into the electrical detection area during an electrical detection process and thus the electrical detection area has a greater thickness. The void area has the minimum thickness. Thicknesses of other areas are between that of the electrical detection area and that of the void area. Therefore, the surface of the driving region is made to be uneven, and in the process of orientation friction, after the cloth passes through the driving region for multiple times, the cloth surface will be damaged, for example, the fibers on the cloth surface will have inconsistent orientations. Since the orientation friction direction is in parallel with the extending direction of the data line or is angled by 45° with respect to the extending direction of the data line, portions of fibers in the cloth having inconsistent orientations will pass through the display region, so that the grooves on the surface of the orientation film after the orientation friction are made to have inconsistent orientations, which affects the display effect of the liquid crystal display device.

SUMMARY

At least one embodiment of the present disclosure provides a substrate and an array substrate which can overcome the problem of inconsistent orientations of the grooves on the surface of the orientation film after being subjected to orientation friction.

A substrate comprising at least one array substrate, wherein each of the array substrate on the substrate is provided with a spacing region at its periphery, and each of the array substrate comprises a display region and a driving region at the margin of the display region. The spacing region comprises a first region and a second region. The first region corresponds to an extension of the driving region on the substrate along an orientation friction direction. The second region corresponds to an extension of the display region on the substrate along the orientation friction direction. A plurality of via holes are distributed in an overlapping area between the first region and the second region. The via holes have internal dimensions larger than the diameter of the fibers of orientation friction cloth.

The via holes are arranged in a rectangular manner and can have various options. One option is that the via holes in each row in a direction perpendicular to the orientation friction direction correspond to the via holes in an adjacent row one by one in the orientation friction direction. Or alternatively, another option is that the via holes in each row in a direction perpendicular to the orientation friction direction correspond to an gap between the via holes in an adjacent row one by one in the orientation friction direction.

In one embodiment according to the present disclosure, the diameter of the via holes and the spacing between adjacent via holes are particularly defined.

In one embodiment according to the present disclosure, the diameter of the via holes is d, wherein $10\ \mu m \leq d \leq 15\ \mu m$, and in the direction perpendicular to the orientation friction direction, the spacing between two adjacent via holes is w, wherein $10\ \mu m \leq w \leq 15\ \mu m$.

The depth h of the via holes meets the following requirement: $0.8\ \mu m \leq h \leq 1.3\ \mu m$. To meet this requirement, one of the following three solutions can be selected.

In the first solution, the substrate comprises a gate insulation layer and a passivation layer which are formed on a base substrate in sequence, wherein the gate insulation layer and the passivation layer cover the overlapping area in the spacing region, and the via holes penetrate through the gate insulation layer and the passivation layer.

In the second solution, the substrate comprises a gate metallic layer, a gate insulation layer and a passivation layer which are formed on a base substrate in sequence; wherein the gate metallic layer, the gate insulation layer and the passivation layer cover the overlapping area in the spacing region, and the via holes penetrate through the gate metallic layer, the gate insulation layer and the passivation layer.

In the third solution, the substrate comprises a source and drain metallic layer and a passivation layer which are formed on a base substrate in sequence, wherein the source and drain metallic layer and the passivation layer cover the overlapping area in the spacing region, and the via holes penetrate through the source and drain metallic layer and the passivation layer.

In one embodiment according to the present disclosure, the substrate comprises a transparent electrode layer formed on a base substrate, wherein the transparent electrode layer covers the via holes.

In one embodiment according to the present disclosure, the substrate comprises an orientation film layer formed on the transparent electrode layer, and wherein the orientation film layer covers the via holes.

In the substrate according to the embodiments of the present disclosure, since a plurality of via holes are disposed in the spacing region and in the overlapping area between the first region which corresponds to an extension of the driving region on the substrate along the orientation friction direction and the second region which corresponds to an extension of the display region on the substrate along the orientation friction direction, a portion of the orientation friction cloth which passes through both the driving region and the display region will pass through the overlapping area where the via holes are disposed. Further, as the diameter of the via holes is larger than the diameter of the fibers of the orientation friction cloth, the fibers can enter the inside of the via holes and are carded and are made to have consistent orientations, and thus the problem of inconsistent orientations of the grooves on the surface of the orientation film which is subjected to orientation friction in the display region is overcome, and the display effect of the display device is improved.

At least one embodiment of the present disclosure further provides an array substrate comprising a display region at the center of the array substrate and a driving region at the margin of the display region. A spacing region is provided at a periphery of the array substrate. The spacing region comprises a first region and a second region. The first region corresponds to an extension of the driving region on the array substrate along an orientation friction direction. The second region corresponds to an extension of the display region on the array substrate along the orientation friction direction. A plurality of via holes are distributed in an overlapping area between the first region and the second region. The via holes have internal dimensions larger than the diameter of the fibers of orientation friction cloth.

In the array substrate according to the embodiments of the present disclosure, since a plurality of via holes are disposed in the spacing region and in the overlapping area between the first region which corresponds to an extension of the driving region on the array substrate along the orientation friction direction and the second region which corresponds to an extension of the display region on the array substrate along the orientation friction direction, the portion in the orientation friction cloth which passes through both the driving region and the display region will pass through the overlapping area where the via holes are disposed. Further, since the diameter of the via holes is larger than the diameter of the fibers of the orientation friction cloth, a part of fibers can enter the inside of the via holes and can be carded and made to have consistent orientations, and thus the problem of inconsistent orientations of the grooves on the surface of the orientation film which is subjected to orientation friction in the display region is overcome, and the display effect of the display device is improved.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

Figure 1:
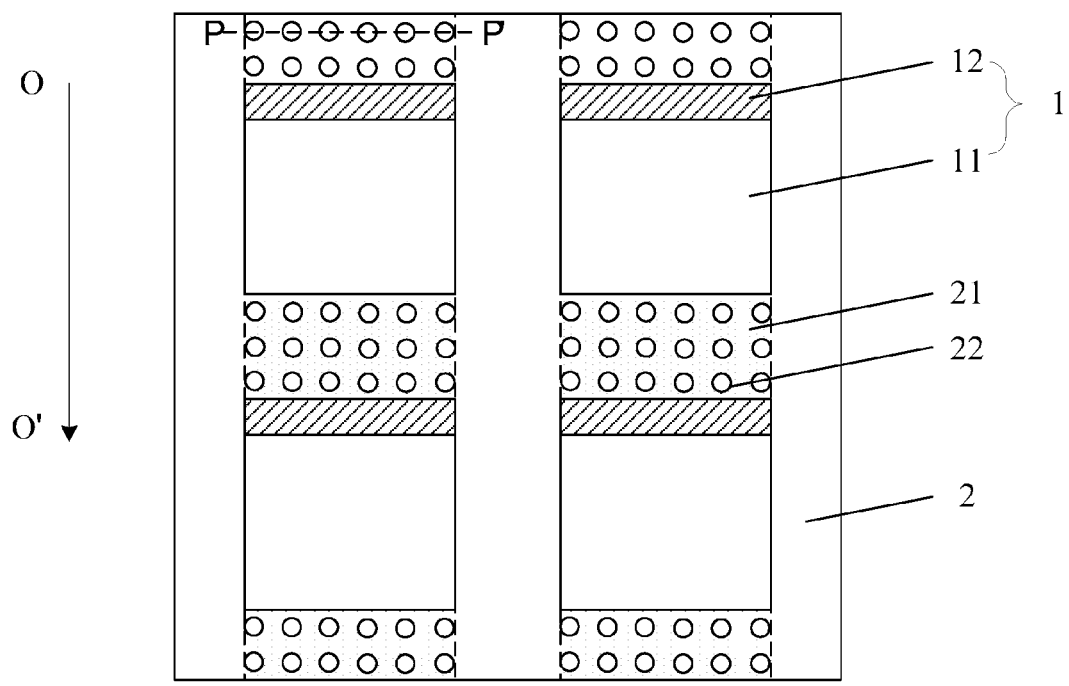
FIG. 1 is a plan view illustrating the substrate according to one embodiment of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

At least one embodiment of the present disclosure provides a substrate. As illustrated in FIG. 1 to FIG. 4, the substrate comprises at least one array substrate 1. Each array substrate 1 on the substrate is provided with a spacing region 2 at the periphery thereof. Each array substrate 1 comprises a display region 11 and a driving region 12 at the margin of the display region 11. The spacing region 2 comprises a first region and a second region (not illustrated in the drawings). The first region corresponds to an extension of the driving region 12 along the orientation friction direction OO', while the second region corresponds to an extension of the display region 11 along the orientation friction direction OO'. A plurality of via holes 22 are distributed in an overlapping area 21 between the first region and the second region. The via holes 22 have internal dimensions larger than the diameter of the fibers of the orientation friction cloth.

It is to be noted that the substrate according to the embodiments of the present disclosure can be cut into at least one array substrate which can be used to produce the following display devices: liquid crystal panel, electronic paper, cell phone, tablet personal computer, television set, display device, laptop computer, digital photo frame, navigation instrument and etc, i.e., the products or parts having display function.

To facilitate understanding of the substrate according to the embodiments of the present disclosure by those skilled in the art, the embodiments of the present disclosure provide four types of substrate as illustrated in FIG. 1 to FIG. 4. The difference of the four types of substrate lies in that the position of the driving region 12 and the orientation friction direction OO' are different.

The first type of substrate is illustrated in FIG. 1. The orientation friction direction OO' is in parallel with the extending direction of the data line and the driving region 12 is only positioned at an end of the data line. In this case, as for each array substrate 1, the first region which corresponds to an extension of the driving region 12 on the substrate along the orientation friction direction OO' and the second region which corresponds to an extension of the display region 11 on the substrate along the orientation friction direction OO' have an identical range. Therefore, on this first type of substrate, the overlapping area 21, the first region and the second region have the same range, and the overlapping area 21 is arranged along the orientation friction direction OO' in sequence.

Figure 2:
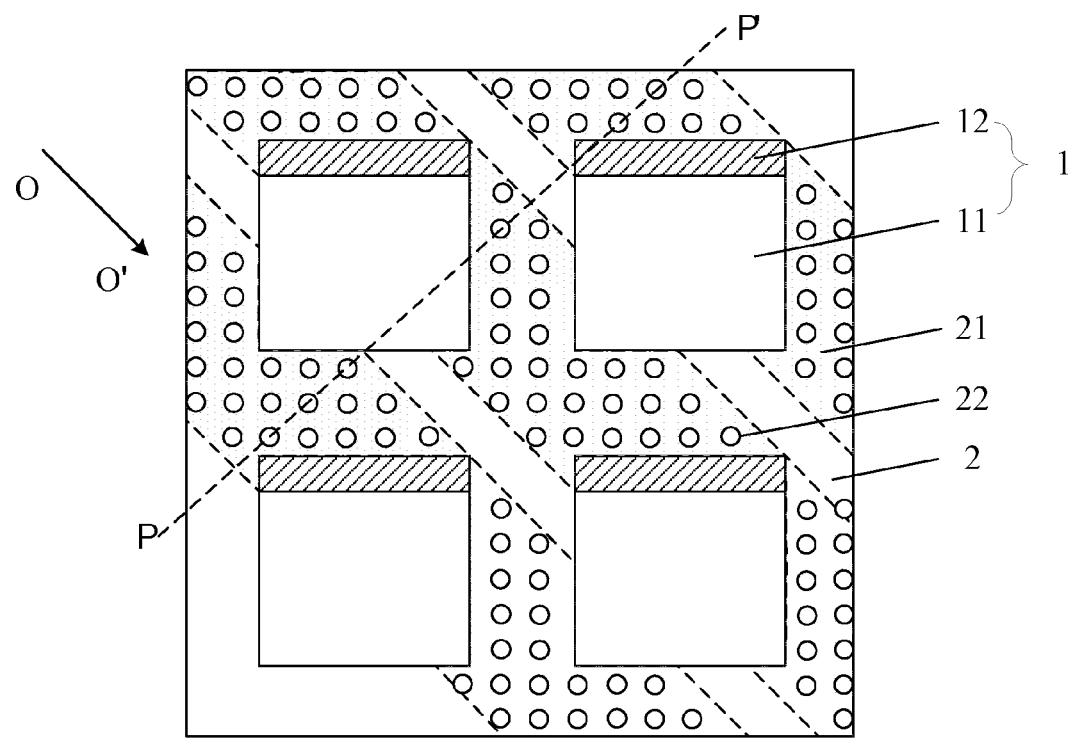
FIG. 2 is a plan view illustrating the substrate according to another embodiment of the present disclosure.

The second type of substrate is illustrated in FIG. 2. The orientation friction direction OO' is angled by 45° with respect to the extending direction of the data line and the driving region 12 is only positioned at an end of the data line. In this case, as for each array substrate 1, the first region which corresponds to an extension of the driving region 12 on the substrate along the orientation friction direction OO' is located within the second region which corresponds to an extension of the display regions 11 of adjacent array substrates 1 on the substrate along the orientation friction direction OO'. Therefore, on this second type of substrate, the overlapping area 21 and the first region have the same range and the overlapping area 21 is arranged along the orientation friction direction OO' in sequence.

Figure 3:
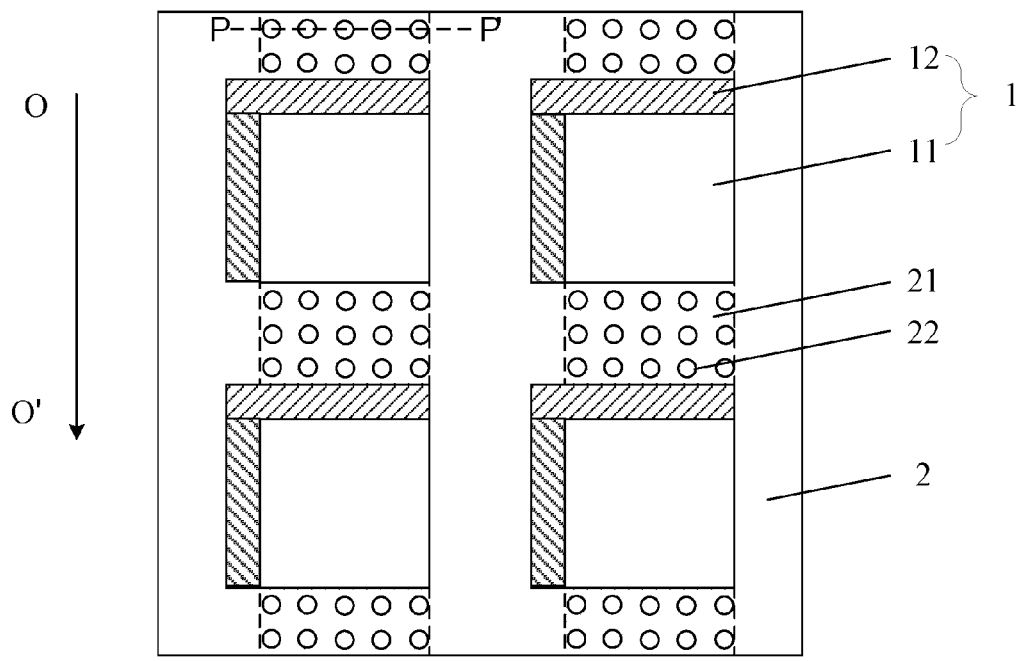
FIG. 3 is a plan view illustrating the substrate according to yet another embodiment of the present disclosure.

The third type of substrate is illustrated in FIG. 3. The orientation friction direction OO' is in parallel with the extending direction of the data line. A portion of the driving region 12 is positioned at an end of the data line and another portion of the driving region 12 is positioned at an end of the gate line which is crossed with the data line. In this case, as for each array substrate 1, the second region which corresponds to an extension of the display region 11 on the substrate along the orientation friction direction OO' is located within the first region which corresponds to an extension of the driving region 12 on the substrate along the orientation friction direction OO'. Therefore, on this third type of substrate, the overlapping area 21 and the second region have the same range and the overlapping area 21 is arranged along the orientation friction direction OO' in sequence.

Figure 4:
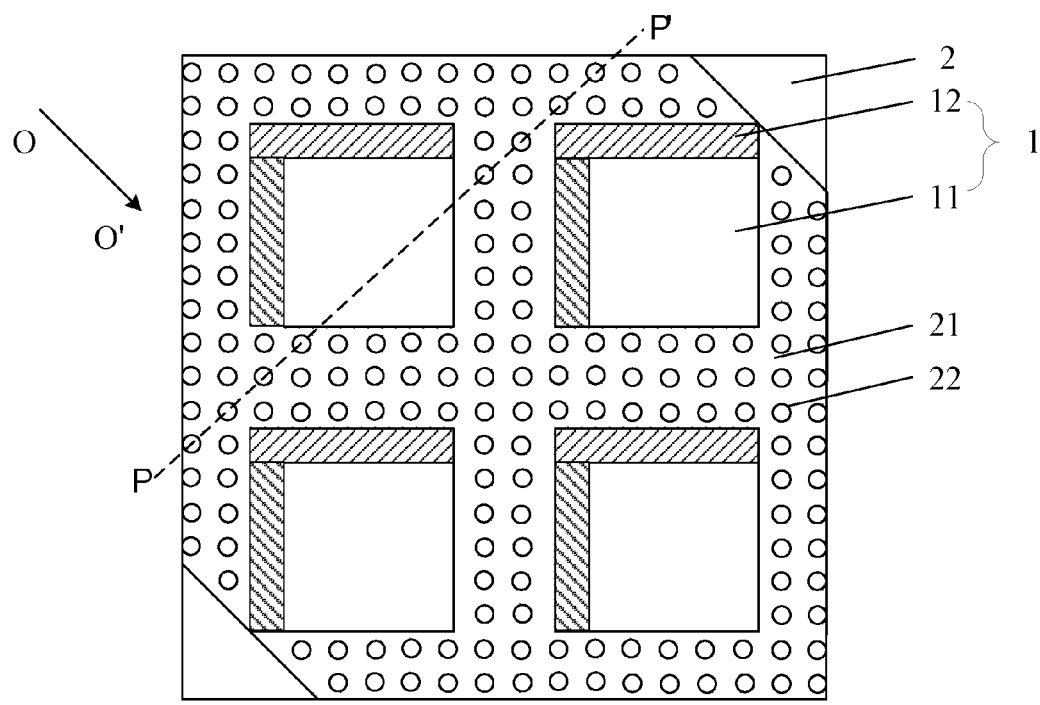
FIG. 4 is a plan view illustrating the substrate according to yet another embodiment of the present disclosure.

The fourth type of substrate is illustrated in FIG. 4. The orientation friction direction OO' is angled by 45° with respect to the extending direction of the data line. A portion of the driving region 12 is positioned at an end of the data line and another portion of the driving region 12 is positioned at an end of the gate line which is crossed with the data line. The two portions are symmetrically disposed along the orientation friction direction OO'. In this case, as for each array substrate 1, the second region which corresponds to an extension of the display region 11 on the substrate along the orientation friction direction OO' is located within the first region which corresponds to an extension of the driving region 12 on the substrate along the orientation friction direction OO', and the first region which corresponds to an extension of the driving region 12 on the substrate along the orientation friction direction OO' is located within a second region which corresponds to an extension of the display region 11 of adjacent array substrates 1 comprising the array substrate 1 on the substrate along the orientation friction direction OO'. Therefore, on this fourth type of substrate, the overlapping area 21, the first region and the second region have an identical range and the overlapping area 21 is interconnected and is thus integrated.

It is to be noted that those skilled in the art can obtain other possible specific embodiments without any creative work on the basis of the above four specific embodiments. A detailed description of the embodiments of the present disclosure is omitted.

In the substrate provided by the embodiments of the present disclosure, since a plurality of via holes are disposed in the spacing region and in the overlapping area between the first region which corresponds to an extension of the driving region on the substrate along the orientation friction direction and the second region which corresponds to an extension of the display region on the substrate along the orientation friction direction, the portion in the orientation friction cloth which passes through both the driving region and the display region will pass through the spacing region where the via holes are disposed. Further, since the diameter of the via holes is larger than the diameter of the fibers of the orientation friction cloth, a part of fibers can enter the inside of the via holes and the fibers can be carded and made to have consistent orientations, and thus the problem of inconsistent orientations of the grooves on the surface of the orientation film which is subjected to orientation friction in the display region is overcome, and the display effect of the display device is improved.

To improve the carding effect of the fibers in the orientation friction cloth and thus improving the consistency of the fiber orientation, in one embodiment of the present disclosure, the via holes are regularly arranged. For example, the via holes can be arranged in one arrangement of the following two arrangements.

The first arrangement is illustrated in FIG. 1 and FIG. 3. The via holes 22 are arranged in a rectangular manner. The via holes 22 in each row in a direction PP' perpendicular to the orientation friction direction OO' correspond to the via holes 22 in an adjacent row one by one in the orientation friction direction OO'. This arrangement of the via holes 22 is relatively simple and thus a region in the mask plate which corresponds to the via holes has a relatively simple arrangement. Therefore, the manufacturing difficulty of the array substrate is reduced.

Figure 5:
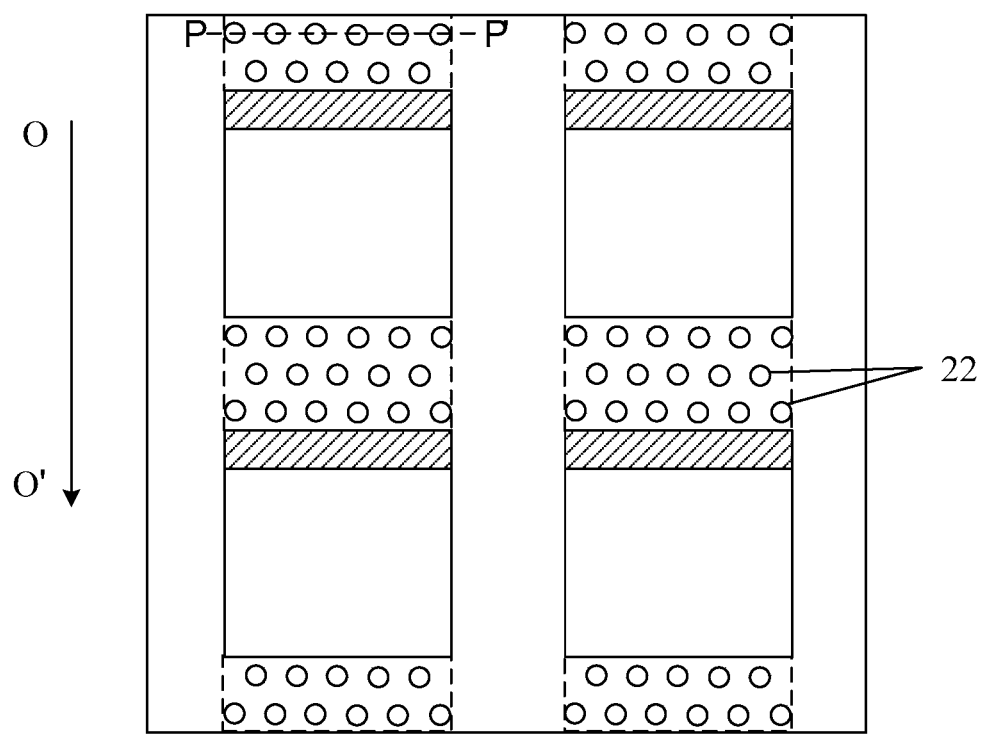
FIG. 5 is a plan view illustrating the substrate according to yet another embodiment of the present disclosure.

The second arrangement is illustrated in FIG. 2, FIG. 4 and FIG. 5. The via holes 22 are arranged is in a rectangular manner. The via holes 22 in each row in a direction PP' perpendicular to the orientation friction direction OO' correspond to the gap between the via holes 22 in an adjacent row one by one in the orientation friction direction OO'. This arrangement of via holes 22 increases carding area of the orientation friction cloth and thus improves the consistency of the fiber orientation.

Typically, the diameter of the fibers of the orientation friction cloth is between 10 μm and 13 μm. The diameter d of the via holes 22 is close to the diameter of the fibers of the orientation friction cloth, while ensuring that the diameter d of the via holes 22 is larger than the diameter of the fibers. The consistency of fiber orientation is improved and the carding effect of the fibers is improved. In one embodiment of the present disclosure, 10 μm≤d≤15 μm.

Further, to improve the carding effect of the fibers and thus to improve the consistency of fiber orientation, in the direction PP' perpendicular to the orientation friction direction OO', the spacing w between two adjacent via holes 22 is close to the diameter of the fibers of the orientation friction cloth. In one embodiment of the present disclosure, 10 μm≤w≤15 μm.

In one embodiment of the present disclosure, the depth of the via holes 22 is h, wherein 0.8 μm≤h≤1.3 μm. Therefore, the carding effect of the fibers is further improved and thus the consistency of fiber orientation is improved.

To form the via holes having the above depth, the embodiments of the present disclosure provide the following three types of structure for the overlapping area where the via holes are disposed. The difference of the three types of structure lies in different layered structure of the overlapping area.

In the first structure, the substrate comprises a gate insulation layer and a passivation layer which are formed on the base substrate in sequence and both of which cover the overlapping area in the spacing region, and the via holes penetrate through the gate insulation layer and the passivation layer. Typically, the thickness of the gate insulation layer is 0.4 μm, and the thickness of the passivation layer is 0.6 μm. Thus, the depth of the via holes is 1.0 μm. In the manufacturing process of via holes, after the gate insulation layer and the passivation layer are sequentially formed on base substrate, a pattern of via holes penetrating through the gate insulation layer and the passivation layer is formed by performing one patterning process and continuously etching the passivation layer and gate insulation layer in an etching process.

It is to be noted that the patterning process described in all the embodiments of the present disclosure comprises coating photoresist, covering by a mask plate, etching after exposing and developing, and finally peeling off the photoresist.

In the second structure, the substrate comprises a gate metallic layer, a gate insulation layer and a passivation layer which are formed on the base substrate in sequence and all of which cover the overlapping area in the spacing region, and the via holes penetrate through the gate metallic layer, the gate insulation layer and the passivation layer. Typically, the thickness of the gate metallic layer is 0.3 µm, the thickness of the gate insulation layer is 0.4 µm, and the thickness of the passivation layer is 0.6 µm. Thus, the depth of the via holes is 1.3 µm. In the manufacturing process of via holes, firstly, a gate metallic layer is formed on the base substrate and then a pattern including a gate line, a gate electrode of the thin-film transistor and a via hole penetrating through the gate metallic layer is formed by performing one patterning process; and then a gate insulation layer and a passivation layer are formed on the base substrate formed with the pattern including a gate line, a gate electrode and a via hole penetrating through the gate metallic layer; and then a pattern of via holes penetrating through the gate metallic layer, the gate insulation layer and the passivation layer is formed by performing one patterning process and continuously etching the passivation layer and gate insulation layer in an etching process.

In the third structure, the substrate comprises a source and drain metallic layer and a passivation layer which are formed on the base substrate in sequence and both of which cover the overlapping area in the spacing region, and the via holes penetrate through the source and drain metallic layer and the passivation layer. Typically, the thickness of the source and drain metallic layer is 0.3 µm, and the thickness of the passivation layer is 0.6 µm. Thus, the depth of the via holes is 0.9 µm. In the manufacturing process of via holes, firstly a source and drain metallic layer is formed on the base substrate, and then a pattern including a data line, a source electrode and a drain electrode of the thin-film transistor and a via hole penetrating through the source and drain metallic layer is formed by performing one patterning process; and then a passivation layer is formed on the base substrate formed with the pattern of a data line, a source electrode and a drain electrode of the thin-film transistor and a via hole penetrating through the source and drain metallic layer, and then a pattern of via holes penetrating through the source and drain metallic layer and the passivation layer is formed by performing one patterning process.

Since the via holes have relatively sharp edges, the orientation friction cloth will be worn when passing through the via holes. Therefore, in one embodiment of the present disclosure, a transparent electrode layer is formed on the base substrate and covers the via holes so that the edges of the via holes are made relatively smooth and thus wear of orientation friction cloth is reduced. The transparent electrode layer and the pixel electrode which is positioned within the display region are formed in the same layer and thereby lowering the manufacture cost of the substrate.

Typically, the material of the transparent electrode layer covering the via holes is metal, so that the transparent electrode layer has a relatively rough surface and thus the wear of the orientation friction cloth is relatively great. Therefore, in one embodiment of the present disclosure, an orientation film layer is formed on the transparent electrode layer and covers the via holes. The material of the orientation film layer is typically polymer material which produces a relatively smooth surface of the orientation film layer, and thus the wear of the orientation friction cloth is reduced.

At least one embodiment of the present disclosure also provides an array substrate comprising a display region at the center of the substrate and a driving region at the margin of the display region. A spacing region comprising a first region and a second region is disposed at the periphery of the array substrate. The first region corresponds to an extension of the driving region on the array substrate along the orientation friction direction and the second region corresponds to an extension of the display region on the array substrate along the orientation friction direction. A plurality of via holes are distributed in an overlapping area between the first region and second region. The via holes have internal dimensions larger than the diameter of the fibers of the orientation friction cloth.

The above array substrate can be formed by cutting the substrate as described in the above embodiments. The cut array substrate may comprise an entire or partial spacing region adjacent thereto or may not comprise any spacing region.

It is to be noted that during the cutting process of the substrate, cutting can be performed along an edge of the spacing region so that among the array substrates obtained by cutting, a part of array substrates may comprise the whole of said spacing region, a part of array substrates may not comprise the spacing region, or a part of array substrates may comprise a portion of spacing region adjacent thereto. Of course, cutting may be performed along any line within the spacing region. In this case, all the array substrate comprise a portion of spacing region.

In the array substrate provided by the embodiments of the present disclosure, since a plurality of via holes are disposed in the spacing region and in the overlapping area between the first region which corresponds to an extension of the driving region on the array substrate along the orientation friction direction and the second region which corresponds to an extension of the display region on the array substrate along the orientation friction direction, the portion in the orientation friction cloth which passes through both the driving region and the display region will pass through the overlapping area where the via holes are disposed. Further, since the diameter of the via holes is larger than the diameter of the fibers of the orientation friction cloth, a part of fibers can enter the inside of the via holes and the fibers can be carded and be made to have consistent orientations, and thus the problem of inconsistent orientations of the grooves on the surface of the orientation film which is subjected to orientation friction in the display region is overcome, and the display effect of the display device is improved.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201510130550.X filed on Mar. 24, 2015, the disclosure of which is hereby entirely incorporated by reference.

The invention claimed is:

1. A substrate, comprising at least one array substrate, each of the array substrate being provided with a spacing region at its periphery, and each of the array substrate comprising a display region and a driving region at the margin of the display region, wherein the spacing region comprises a first region and a second region;

the first region corresponds to an extension of the driving region on the substrate along an orientation friction direction, the second region corresponds to an extension of the display region on the substrate along the orientation friction direction, a plurality of via holes are distributed in an overlapping area between the first region and the second region, and the via holes have internal dimensions larger than a diameter of fibers of orientation friction cloth.

2. The substrate according to claim 1, wherein the via holes are arranged in a rectangular manner, and the via holes in each row in a direction perpendicular to the orientation friction direction correspond to the via holes in an adjacent row one by one in the orientation friction direction.

3. The substrate according to claim 2, wherein the via holes have a diameter of d, wherein 10 µm≤d≤15 µm.

4. The substrate according to claim 2, wherein in the direction perpendicular to the orientation friction direction, an spacing between two adjacent via holes is w, wherein 10 µm≤w≤15 µm.

5. The substrate according to claim 2, wherein the via holes have a depth of h, wherein 0.8 µm≤h≤1.3 µm.

6. The substrate according to claim 1, wherein the via holes are arranged is in a rectangular manner, and the via holes in each row in a direction perpendicular to the orientation friction direction correspond to an gap between the via holes in an adjacent row one by one in the orientation friction direction.

7. The substrate according to claim 6, wherein the via holes have a diameter of d, wherein 10 µm≤d≤15 µm.

8. The substrate according to claim 6, wherein in the direction perpendicular to the orientation friction direction, an spacing between two adjacent via holes is w, wherein 10 µm≤w≤15 µm.

9. The substrate according to claim 6, wherein the via holes have a depth of h, wherein 0.8 µm≤h≤1.3 µm.

10. The substrate according to claim 1, wherein the via holes have a diameter of d, wherein 10 µm≤d≤15 µm.

11. The substrate according to claim 10, wherein in the direction perpendicular to the orientation friction direction, an spacing between two adjacent via holes is w, wherein 10 µm≤w≤15 µm.

12. The substrate according to claim 10, wherein the via holes have a depth of h, wherein 0.8 µm≤h≤1.3 µm.

13. The substrate according to claim 1, wherein in the direction perpendicular to the orientation friction direction, a spacing between two adjacent via holes is w, wherein 10 µm≤w≤15 µm.

14. The substrate according to claim 1, wherein the via holes have a depth of h, wherein 0.8 µm≤h≤1.3 µm.

15. The substrate according to claim 1, comprising a gate insulation layer and a passivation layer which are formed on a base substrate in sequence,
wherein the gate insulation layer and the passivation layer cover the overlapping area, and the via holes penetrate through the gate insulation layer and the passivation layer.

16. The substrate according to claim 1, comprising a gate metallic layer, a gate insulation layer and a passivation layer which are formed on a base substrate in sequence;
wherein the gate metallic layer, the gate insulation layer and the passivation layer cover the overlapping area, and the via holes penetrate through the gate metallic layer, the gate insulation layer and the passivation layer.

17. The substrate according to claim 1, comprising a source and drain metallic layer and a passivation layer which are formed on a base substrate in sequence,
wherein the source and drain metallic layer and the passivation layer cover the overlapping area, and the via holes penetrate through the source and drain metallic layer and the passivation layer.

18. The substrate according to claim 1, comprising a transparent electrode layer formed on a base substrate, wherein the transparent electrode layer covers the via holes.

19. The substrate according to claim 18, comprising an orientation film layer formed on the transparent electrode layer, wherein the orientation film layer covers the via holes.

20. An array substrate, comprising a display region at the center of the array substrate and a driving region at the margin of the display region, a spacing region being provided at a periphery of the array substrate, wherein the spacing region comprises a first region and a second region;
the first region corresponds to an extension of the driving region on the array substrate along an orientation friction direction, the second region corresponds to an extension of the display region on the array substrate along the orientation friction direction, a plurality of via holes are distributed in an overlapping area between the first region and the second region, and the via holes have internal dimensions larger than a diameter of fibers of orientation friction cloth.

* * * * *